United States Patent

[11] 3,612,580

| [72] | Inventor | Lawrence R. Jones |
| | | Cuyahoga Falls, Ohio |
| [21] | Appl. No. | 39,052 |
| [22] | Filed | May 20, 1970 |
| [45] | Patented | Oct. 12, 1971 |
| [73] | Assignee | The Goodyear Tire & Rubber Company |
| | | Akron, Ohio |

[54] HOSE SPLICE
11 Claims, 3 Drawing Figs.

[52] U.S. Cl. ................................................ 285/293,
138/137, 285/371, 285/423, 285/DIG. 16
[51] Int. Cl. ........................................................ F16l 31/00
[50] Field of Search............................................ 156/228;
285/370, DIG. 16, 371, 260, 243, 423; 138/137

[56] References Cited
UNITED STATES PATENTS
2,896,973  7/1959  Wiltse ............................. 285/370 X 3,053,724  9/1962  Galloway........................ 285/293 X
3,100,659  8/1963  Rittenhouse ................... 285/260
3,342,656  9/1967  Papogeorges ................. 285/260 X
3,467,412  9/1969  Gore et al. ...................... 285/293
3,387,864  6/1968  Walters .......................... 285/DIG. 16

Primary Examiner—Dave W. Arola
Attorneys—F. W. Brunner and Ronald P. Yaist

ABSTRACT: A hose splice for joining adjacent lengths or segments of reinforced hose having a tube, at least one hose reinforcing layer and a cover. The splice construction includes a tapered inner sealing ring of flexible, elastomeric material bonded to the inner surface of the hose tube which acts to distribute the stresses to which the splice is subjected, at least one splice reinforcing layer or ply surrounding and bonded to each hose segment and a splice cover of flexible material surrounding and bonded to the radially outermost splicing ply. The splice construction may also include an outer sealing ring surrounding the hose tubes and bonded to the innermost splice ply. The splice is particularly suitable for field splicing operations.

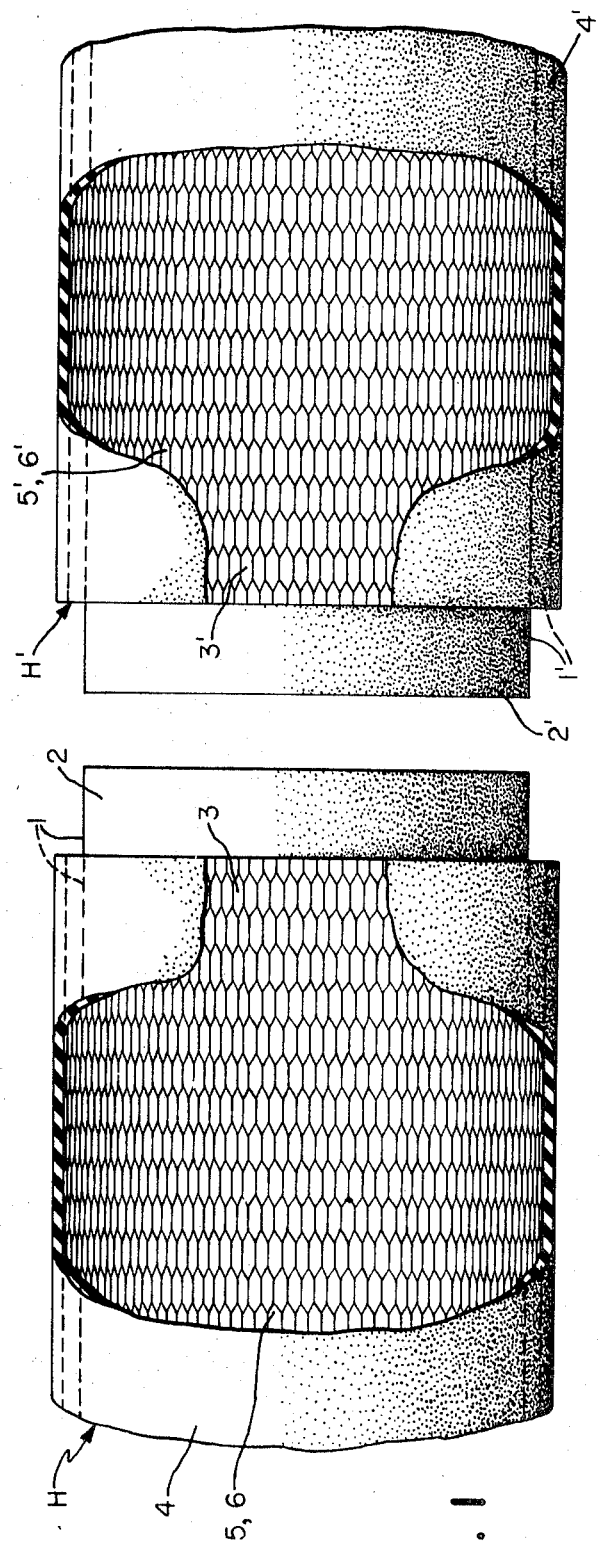
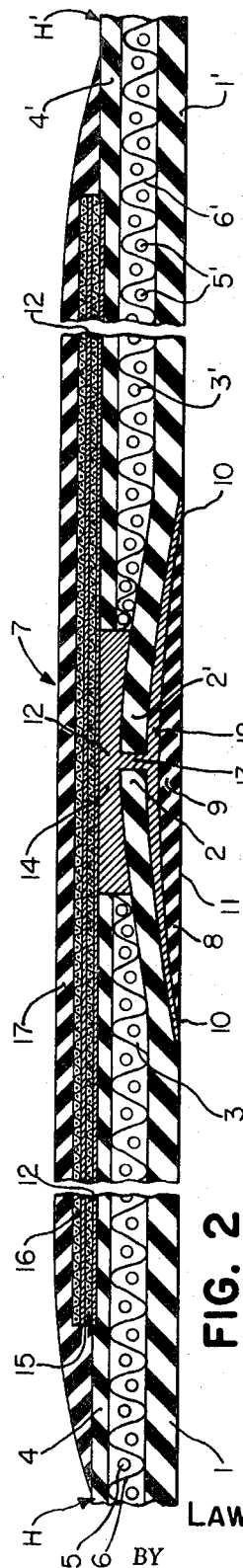
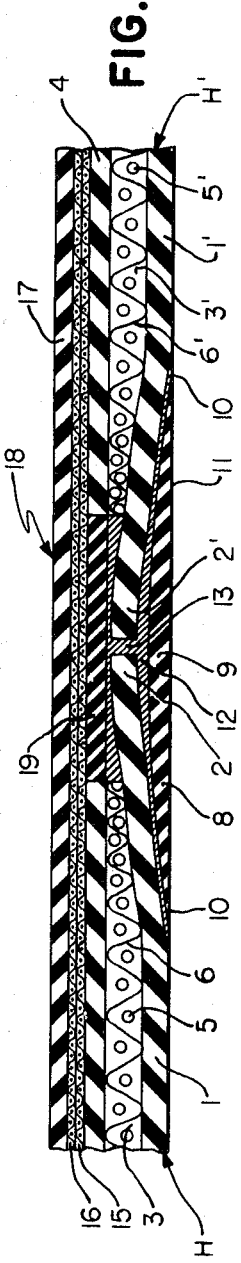
PATENTED OCT 12 1971    3,612,580
FIG. 1
FIG. 2
FIG. 3
INVENTOR.
LAWRENCE R. JONES
BY Ronald P. Yaist
ATTORNEY

HOSE SPLICE

BACKGROUND OF THE INVENTION

This invention relates to hose splices or repairs for joining two or more segments of flexible hose to form long length hose or for repairing same. More particularly, this invention relates to an improved hose splice or repair which can be accomplished economically and will withstand internal stresses to which the hose is subjected during service. The invention also has particular application to such a hose splice or repair for long length vulcanized hose which does not require the use of vulcanizing equipment and thus can be utilized in field splicing operations.

The usual practice followed in manufacturing most conventional flexible reinforced hose is to assemble on a hollow cylindrical mandrel the various materials which make up the hose structure. The usual materials for this purpose are a hose tube of uncured or unvulcanized rubber or rubberlike material, at least one hose reinforcing ply, preferably of a textile fabric material which may or may not be impregnated with uncured rubber, and an outer unvulcanized rubber hose cover. These materials are then cured or vulcanized by means of heat and pressure. The usual length of the mandrel is approximately 50 feet due to the fact that this is the length of the generally available vulcanizing equipment. Accordingly, each hose section or segment is made in this length although other lengths can be made depending upon the available equipment. For example, in some special applications hose is manufactured in long lengths by special vulcanizing procedures. In this regard, woven-jacket hose for irrigation systems are typically produced in lengths of 660 feet.

In most instances, however, if longer lengths are desired, the segments are joined together by means of metal couplings attached to the ends. This assembly has the disadvantage of being susceptible to leakage between the couplings and the hose in addition to being a cumbersome and difficult arrangement to handle.

It has been found that the so-called "soft splices" in which no metal couplings are used have been successful especially for fabric-reinforced hose. Such a splice structure is described in U.S. Pat. No. 3,467,412. However, this splice requires vulcanization to effect a splice of sufficient strength and is therefore not readily adaptable for field splicing operations. Moreover, in regard to long length woven-jacket hose used in irrigation systems, field splicing and repairing which does not require vulcanization is highly desirable because of the inaccessibility of steam supply or electrical lines required by conventional vulcanizing equipment.

The disadvantages of previous hose splices have been overcome by the hose splice or repair of the present invention which will be hereinafter described.

OBJECTS OF THE INVENTION

A primary object of this invention is to provide a means of uniting, without the use of metal end couplings, segments of hose into sufficiently long lengths that cannot be manufactured on conventional hose-building equipment.

It is another object of this invention to provide an economical means of splicing and repairing vulcanized hose segments without the necessity of vulcanizing equipment.

It is another object of this invention to provide a hose splice or repair construction which will withstand the internal stresses to which the hose is subjected during service.

Other objects and advantages of this invention will become apparent hereinafter as the description thereof proceeds, the novel features, arrangements and combinations being clearly pointed out in the specification as well as the claims thereunto appended.

It has been found in accordance with the present invention, that the beforementioned objects can be accomplished by providing a hose splice for joining or repairing two adjacent lengths of flexible hose lying in substantially abutting relationship to form a juncture therebetween and each hose length includes a hose tube of flexible material with an end portion thereof being exposed, at least one reinforcing layer surrounding the tube with the end portions of each layer terminating at a distance short of the end of the exposed tube, and a cover of flexible material surrounding the radially outermost reinforcing layer and terminating at a distance short of the end of the tube. The hose splice includes a sealing ring of flexible elastomeric material, the outer surface of which is bonded to the inner surface of each of the tubes at the juncture of the ends thereof. The ring has a greater thickness in the center thereof than at the edges thereof to present a tapered configuration which distributes the internal stresses to which the splice is subjected. The splice further includes at least one splice reinforcing layer surrounding and bonded to each of the hose lengths, and a splice cover of flexible material surrounding and bonded to the radially outermost splice layer.

It has also been found that when the components of this construction are bonded together by means of an adhesive system not requiring vulcanization, a splice or repair is provided which is particularly suitable for field splicing or repairing operations.

BRIEF DESCRIPTION OF THE DRAWINGS

In the drawings:

FIG. 1 is a view, with parts broken away of the ends of two segments of hose prepared for splicing according to the present invention;

FIG. 2 is an enlarged partially sectional view showing the splice construction of the present invention; and FIG. 3 is a modification of the invention shown in FIG. 2.

DESCRIPTION OF THE PREFERRED EMBODIMENTS

Although reinforced hoses of various constructions may be spliced in the manner disclosed in this invention, the specific embodiment described is the splicing of two lengths or segments of 4-inch, inside diameter woven-jacket reinforced hose used in irrigation system applications. Of course it is to be understood that the hose tube and cover are composed of elastomeric material such as natural or synthetic rubber.

Referring now to the drawings, in FIG. 1, two previously vulcanized opposed hose lengths or segments H and H' are shown preparatory to splicing. Each hose segment H and H' includes a hose tube 1 and 1' having its end 2 and 2' exposed, at least one reinforcing layer 3 and 3' of loomed or woven fabric surrounding the tube 1 and 1', the end portion of which terminates at a distance short of the end 2 and 2' of the exposed tube 1 and 1', and a hose cover 4 and 4' which surrounds the radially outermost hose reinforcing layer 3 and 3' and terminates at a distance short of the end 2 and 2' of the exposed tube 1 and 1'. Preferably as shown in FIG. 1, the reinforcing layer 3 and 3' and the hose cover 4 and 4' terminate substantially equidistant from the end 2 and 2' of the tube 1 and 1'.

The tube 1 and 1' may be composed of any flexible material and is preferably composed of a flexible polymeric material such as natural rubber, synthetic rubber or a flexible plastic such as polyvinyl chloride. The thickness of the tube is typically about 0.045 of an inch. The hose reinforcing layer 3 and 3' is generally of a textile fabric material such as cotton, nylon, rayon or polyester or combinations thereof, but may also be manufactured from materials such as fiber glass and steel wire mesh. The woven-jacket construction includes one layer 3 and 3' of textile fabric yarn, which in this instance has a weft or fill 5 and 5' of nylon fabric and a warp 6 and 6' of polyester fabric. The gauge of the particular woven fabric structure illustrated is about 0.060 of an inch. Of course, it is to be understood that the layers 3 and 3' may be of any of the well-known fabric constructions. For example, in addition to the loomed construction as shown, these may also be of a braided or wrapped construction. The hose cover 4 and 4' may be composed of the same type materials as the hose tube 1 and 1' and has a relatively thin wall gauge of about 0.032 of an inch.

The finished splice structure 7 of this invention is shown in FIG. 2. In order to more clearly illustrate the splice construction 7, the splicing procedure will be hereinafter described. The ends of the hose segments H and H' are first washed, preferably with a mild detergent, cut off square and washed again with a suitable solvent. The hose reinforcing yarns 5, 5' and 6, 6' of plies 3 and 3' and the hose covers 4 and 4' are removed or stripped back from the hose tube for a distance of about one-fourth to about three-eighth of an inch in a direction lengthwise of the hose segments H and H' and trimmed even. The inside surfaces of the hose tubes 1 and 1' at the exposed ends 2 and 2' and axially inward therefrom are buffed for a distance of about 1½ inches while the covers 4 and 4' of the hose are buffed for a distance of about 10 inches on each hose segment H and H'. A suitable solvent wash is then applied to the buffed areas.

A sealing ring 8 of flexible elastomeric material, preferably having the same inside diameter as the hose tubes 1 and 1', is centered on a splicing mandrel (not shown) which for field splicing service, may be about 3 feet in length. The ring 8 in this instance is about 1½ inches wide and has a greater thickness at its center 9 than at its edges 10 to present a tapered configuration. Although its thickness may vary, it has been found that a sealing ring 8 with a center 9 thickness of about 0.031 of an inch and an edge 10 thickness of about 0.002 of an inch provides a desired tapered configuration. The inner surface 11 of the ring 8 is preferably substantially cylindrical in order to present a smooth surface on the inside of the hose splice which will not impede the flow of liquids therethrough. The ring 8 is preferably vulcanized prior to its positioning onto the splicing mandrel. A coating 12 of a suitable adhesive such as an elastomeric cement is applied over the exposed outer surface of the sealing ring 8. It is to be understood that in some instances, the particular adhesive system used may require that a primer be first applied over the surface to be coated. The inside surface of the hose tubes 1 and 1' at the exposed ends 2 and 2' and axially inwardly therefrom are also covered or coated with a suitable adhesive for a distance of about 1½ inches and after a proper drying time, are slipped over the splicing mandrel with the ends 2 and 2' of the tubes 1 and 1' even with the edges 10 of the sealing ring 8 on the mandrel. After a liberal amount of adhesive is applied to the outer surface of the sealing ring 8 and to the inner surfaces of the tubes 1 and 1', the tube ends 2 and 2' are butted so that the sealing ring 8 is centered approximately at the juncture 13 of the exposed ends 2 and 2' of the tubes so that it may be adhered to substantially equal portions of the hose segments H and H'.

The adhesive coating 12 should be applied so that it covers and fills the entire area 14 of the splice around the tube ends 2 and 2' and between the ends of the fabric layer 3 and cover 4 and fabric layer 3' and cover 4'. If the ends 2 and 2' of the tubes 1 and 1' do not butt together perfectly, it is to be expected and desirable for a portion of the adhesive coating 12 or cement to flow into the juncture 13 therebetween.

The sealing ring 8 formed in this manner with a tapered configuration, will act to distribute the stresses to which the splice 7 may be subjected over the entire area of the ring 8. Thereby the joint between the hose segments H and H' will not be subjected to a concentrated stress which could damage the splice 7. Furthermore, the ring 8 being flexible acts as a diaphragm when subjected to the internal pressure of the liquid in the hose and is forced against the inner surface of the tubes 1 and 1' to seal the juncture 13 therebetween. For this purpose, the ring 8 should be at least as flexible as the hose tubes 1 and 1'.

The hose covers 4 and 4' are next coated with the adhesive for a distance of from about 9 or 10 inches on each hose segment H or H'. Splice layers in the form of plies 15 and 16 of reinforcing material preferably of a textile fabric such as cotton, rayon, nylon or polyester or combinations thereof, are then positioned to surround the cover 4 and 4' and the coated or cemented area 14 around the hose tube ends 2 and 2' and extend for an equal distance onto each hose segment H and H' so that they are bonded to equal portions thereof. The splice layers may be formed in various manners and be of various well-known constructions as discussed in relation to the hose reinforcing layer 3 and 3'. For example, in this case, the splicing fabric is in the form of square-woven plies 15 and 16. In applying the splicing fabric, a rectangle piece approximately 16 inches by 32 inches may be wrapped around the splice area 14 and the end of the covers 4 and 4' until the desired number of plies of splice reinforcing material are formed. Two plies 15 and 16 as shown in FIG. 2 each having a thickness of about 0.012 of an inch and an overall total thickness of about 0.024 of an inch, have been found to be satisfactory for this purpose. The innermost ply 15 covers about 8 inches of the hose cover 4 and 4' of each hose segment H and H'. For this arrangement, it is preferred that the adhesive is applied to each splice ply 15 and 16 after it is formed. Of course, it is also to be understood that the splice plies 15 and 16 can also be applied individually.

Finally, a coating or splice cover 17 of flexible polymeric material, for example having a thickness of about 0.020 of an inch, is applied over the outermost ply 16 of the splice reinforcing plies 15 and 16 extending for an equal distance onto each hose segment H and H'. The splice cover 17 may be composed of elastomeric material such as natural or synthetic rubber, or be a liquid elastomer which may be similar to the adhesive coating 12. A polyethylene film or nylon tape (not shown) may be applied over the splice cover to give an improved appearance and smooth out the surface of the cover 17.

The splice construction 7 may be subjected to heat and pressure to effect vulcanization of the adhesive coatings 12 or if a self-curable adhesive is used, the splice 7 may be allowed to cure for the proper period to form an integral composite structure. Of course, the application of heat can also accelerate the self-curing process. After the integral hose splice 7 is formed the mandrel is removed. In field splicing operations, this can be accomplished by means of hydraulic pressure, for example, by filling one of the lengths or segments H or H' with water and forcing the mandrel through the other segment H or H'.

In FIG. 3, an alternative splice construction 18 is shown in which an outer sealing ring 19 preferably of vulcanized elastomeric material, is provided around the tube ends 2 and 2' over the cemented area 14. This ring 19 is preferably centered around the juncture 13 of the tube ends 2 and 2' and is of a generally rectangular cross section, for example having a uniform thickness of about 0.031 inches and a width less than that of the inner sealing ring 8 or about one-half of an inch. The outer surface of the sealing ring 19 extends between the ends of the hose reinforcing plies 3 and 3' and is substantially aligned with the outer surface of the hose covers 4 and 4'. The innermost splice ply 15 surrounds and is bonded to the outer surface of the sealing ring 19. The additional splice ply 16 and splice cover 17 complete the splice 18. This splice construction 18 may be superior for some applications as it provides a more adequate seal in the area 14 around the tube ends 2 and 2'.

The splicing ring 19 may be incorporated into the splice structure 18 by first slipping it over the end of one hose segment H or H', for instance, at a distance just beyond the portion of the hose cover 4 and 4' to which the adhesive coating 12 will be applied. After the hose segments H and H' are positioned on the splicing mandrel and the adhesive is applied to the covers 4 and 4', the outer sealing ring 19 is centered over and around the tube ends 2 and 2' at the juncture 13 thereof. The outer surface of the ring 19 is then coated with the adhesive prior to the application of the splice plies 15 and 16 of the splice cover 17.

The adhesive coating 12 may be any of several well-known type adhesives which may or may not require a primer and customarily require heat and pressure to effect a proper bond between the materials an components of the splice construction. However, for field splicing operations in which the necessary vulcanizing equipment is not readily available, it is preferred that any of the well-known self-curing adhesives be used. For example, it has been found that cured or curable polyurethane reaction mixtures are very suitable adhesives for field splicing operations.

It should be apparent to one skilled in the art that even though a vulcanized splice construction is illustrated in the preferred embodiments, the teachings of the invention are equally applicable to a splice construction having unvulcanized splice components such as the inner and outer sealing ring. In this arrangement the necessary bonds are effected by vulcanization under heat and pressure without the use of an adhesive.

While certain representative embodiments and details have been shown for the purpose of illustrating the invention, it will be apparent to those skilled in the art that various changes and modifications may be made therein without departing from the spirit or scope of the invention.

What is claimed is:

1. In a hose splice for joining or repairing two adjacent lengths of flexible hose lying in substantially abutting relationship to form a juncture therebetween and each hose length includes:
   A. an inner tube of flexible material with an end portion thereof being exposed;
   B. at least one reinforcing layer surrounding said tube, the end portions of each said layer terminating at a distance short of the end of said tube; and
   C. a cover of flexible material surrounding said hose reinforcing layer and terminating at a distance short of the end of said tube;
   the improved splice comprising:
   1. a sealing ring of flexible elastomeric material, the outer surface of which is bonded to the inner surface of each said tube at the juncture of the ends thereof, said ring having a greater thickness in the center thereof than at the edges thereof to present a tapered configuration which distributes the internal stresses to which the splice is subjected,
   2. at least one splice reinforcing layer surrounding and bonded to each said hose length, and
   3. a splice cover of flexible material surrounding and bonded to said splice layer.
   4. the beforementioned construction being bonded into an integral structure.

2. The hose splice as claimed in claim 1 wherein said hose reinforcing layers and said hose covers terminate substantially equidistant from the end of said tube.

3. The hose splice as claimed in claim 1 wherein said sealing ring and each said splice reinforcing layer are substantially centered with respect to each hose length and bonded to substantially equal portions thereof.

4. The hose splice as claimed in claim 1 wherein said splice cover is composed of a coating of flexible polymeric material.

5. The hose splice as claimed in claim 1 wherein said splice-reinforcing layer is composed of textile fabric material.

6. The hose splice as claimed in claim 1 wherein said sealing ring is of vulcanized elastomeric material and all of the named splice components are bonded together by means of an adhesive.

7. The hose splice as claimed in claim 1 wherein the splice further comprises a second sealing ring of elastomeric material surrounding and bonded to the outer surface of said tubes and is surrounded by and bonded to said splice reinforcing layer.

8. The hose splice a claimed in claim 7 wherein said second sealing ring extends between the ends of said hose reinforcing layer.

9. The hose splice as claimed in claim 8 wherein the width of said second sealing ring is less than the width of said first-mentioned sealing ring and is substantially centered thereover.

10. A splice for joining or repairing vulcanized integral hose segments positioned in an end-to-end relation to provide a junction therebetween, each of which has an inner tube of elastomeric material, at least one fabric-reinforcing layer surrounding the inner tube, and an outer elastomeric cover, all of said layer and said cover terminating short of the end of said tube, thereby exposing the ends thereof, the splice structure forming an integral structure joining each pair of hose segments and comprising:
   A. an inner sealing ring of vulcanized elastomeric material, the outer surface of which is bonded to the inner surface of each tube at the juncture of the ends thereof, said ring having a greater thickness in the center thereof than at the edge thereof and having a substantially smooth cylindrical inner surface with the outer surface thereof defining a tapered configuration from the center to the edges;
   B. at least one splice ply of reinforcing textile fabric material surrounding and bonded to each hose segment; and
   C. a splice cover of flexible elastomeric material surrounding and bonded to said splice ply.

11. The splice as claimed in claim 10 wherein the splice structure further comprises an outer sealing ring of vulcanized elastomeric material surrounding and bonded to the outer surface of said tubes and is surrounded by and bonded to said splice ply.